Figure 1:
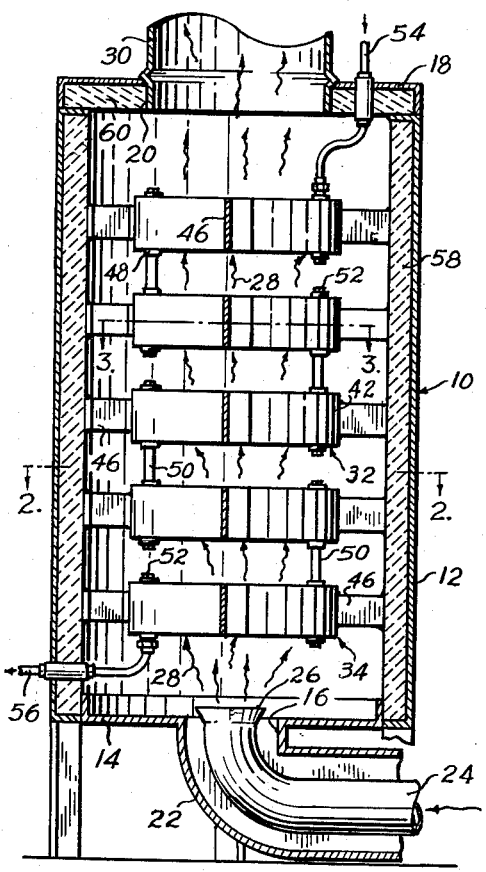

May 2, 1961 C. A. SCOGIN 2,982,264
HEATER FOR CIRCULATING LIQUIDS
Filed July 14, 1958

INVENTOR.
Clifford A. Scogin
BY
ATTORNEY

United States Patent Office 2,982,264
Patented May 2, 1961

2,982,264
HEATER FOR CIRCULATING LIQUIDS
Clifford A. Scogin, 11511 E. Hackett, Sugar Creek, Mo.
Filed July 14, 1958, Ser. No. 748,267
1 Claim. (Cl. 122—214)

This invention relates to heating devices and more particularly, to an improved heater for raising the temperature of liquids circulating through the same.

The most important object of the present invention is to provide a water heater having novel means for producing an uninterrupted supply of hot water as long as water continues to flow through the heater.

A further important object of the instant invention is to provide a water heater having an easily fabricated and inexpensive heat exchanger disposed within the chamber of the heater and adapted for heating the water to a predetermined, required temperature within a relatively short path of travel through the exchanger.

Another of the more important objects of the present invention is to provide a water heater having an improved heat exchanger of the aforementioned character consisting of a series of spaced, relatively narrow, hollow, water-receiving bodies disposed within the path of travel of hot gases emanating from a fuel burner in the chamber and provided with corresponding, aligned tubular elements through each of the same to thereby materially increase the surface area of water exposed to the hot products of combustion, and resulting in more efficient heat exchange to assure raising of the temperature of the water to a desired level in a minimum period of time.

Other important objects of this invention relate to the provision of a water heater wherein the hollow heat exchanger bodies have a number of tubular elements traversing the same and disposed in positions so that corresponding elements are in alignment throughout the longitudinal length of the heating chamber to permit substantially unrestricted flow of hot products of combustion through the chamber, thereby assuring maximum heat transfer to the water flowing through the heat exchanger; to a water heater wherein the cross-sectional areas of the tubular elements in each body are equal to approximately at least one-third of the cross-sectional area of one of the plates forming each body, whereby maximum surface area of the water passing through the heating chamber is provided and resulting in a continuous supply of hot water, irrespective of the length of time such water flows through the water heater; to a water heater wherein the temperature of the water delivered from the structure may be varied by changing the number of hollow bodies forming the heat exchanger; to a water heater which is particularly adapted for utilization with a blast-type fuel burner to assure heating of the water passing through the heater to a preselected temperature in a minimum of time; to a water heater wherein a water supply pipe is coupled to the water-receiving body remote from the blast-type fuel burner, and the water outlet pipe is coupled to the water-receiving body adjacent the fuel burner to most advantageously utilize the heat produced by the burner; and other details of construction and salient features of the instant invention which will become clear or be explained more fully as the following specification progresses.

Figure 3:
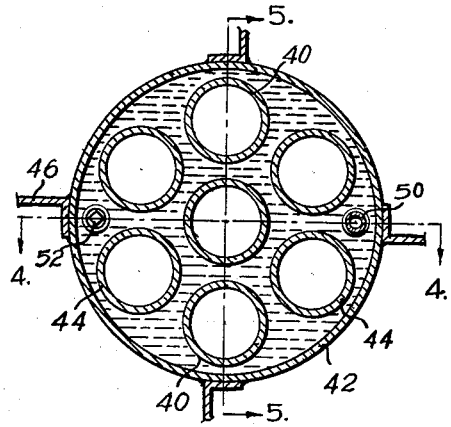
Figure 4:
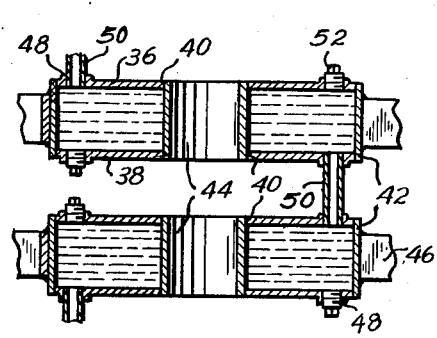
Figure 5:
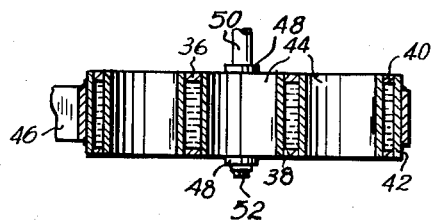
Figure 2:
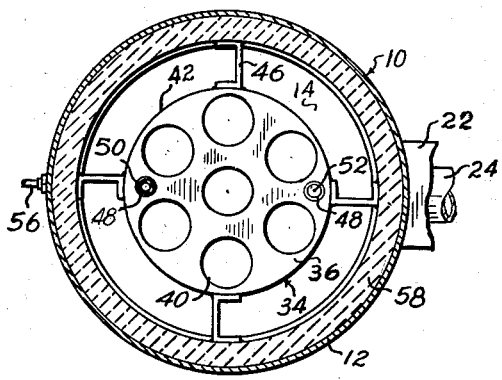

In the drawing:
Figure 1 is a fragmentary, vertical, cross-sectional view taken through a water heater embodying the concepts of the present invention;
Figs. 2 and 3 are horizontal, cross-sectional views taken substantially on the lines 2—2 and 3—3 respectively of Fig. 1 and looking downwardly in the direction of the arrows; and
Figs. 4 and 5 are horizontal, cross-sectional views taken on the lines 4—4 and 5—5 of Fig. 3.

A water heater embodying the preferred concepts of the instant invention is illustrated in the drawing and broadly designated by the numeral 10. Water heater 10 preferably includes an elongated, upright chamber 12 closed at the lower end thereof with a bottom 14 having a central inlet opening 16 in alignment with the longitudinal axis of chamber 12, as well as a top cover 18 normally closing the uppermost end of chamber 12 and having an outlet opening 20 therein of substantially greater size than inlet opening 16.

Tubular elbow 22 communicating with opening 16 in bottom 14 receives an L-shaped, tubular burner 24 positioned with the outlet end 26 thereof extending a slight distance into chamber 12. For purposes to be more fully explained hereinafter, burner 24 is preferably of the blast type and adapted for directing hot products of combustion indicated by arrows 28 upwardly through chamber 12 for discharge via flue 30 intercommunicating the interior of chamber 12 with the atmosphere through outlet opening 20.

Heat exchanger structure for raising the temperature of a supply of water to a predetermined temperature is broadly designated by the numeral 32 and mounted within chamber 12 between tubular fuel burner 24 and flue 30. Structure 32 includes a series of substantially identical, relatively narrow, hollow bodies broadly numerated 34 disposed in vertically spaced relationship between inlet opening 16 and outlet opening 20, and each including a pair of identical, spaced, circular plates 36 and 38 positioned with their axes in substantial alignment with the longitudinal axis of chamber 12 and having equal numbers of opposed, aligned openings 40. An annular band 42 circumscribes each pair of plates 36 and 38 and is suitably joined to respective peripheral edges thereof by welding or the like. Tubular elements 44 extend through each pair of opposed, aligned openings 40 and are connected to corresponding plates 36 and 38 by welding to present water-tight compartments within respective bodies 34.

A number of brackets 46 attached to the outermost surface of corresponding annular bands 42 and extending radially with respect to the axes of plates 36 and 38 are connected to the inner face of chamber 12 at points maintaining hollow bodies 34 in predetermined, vertically spaced relationship between burner 24 and flue 30. It is to be noted that hollow bodies 34 are arranged so that tubular elements 44 therein are disposed in alignment with respective elements 44 in the next adjacent body 34 to thereby permit the hot products of combustion 28 to flow freely through heat exchanger 32 to flue 30.

Although the number of tubular elements 44 in each body 34 is not critical, it has been found that best heat exchange results are obtained if the total cross-sectional area of the tubular elements 44 in each body 34 is equal to approximately at least one-third of the cross-sectional area of one of the plates 36 or 38. Exchange of thermal energy between the hot products of combustion 28 and the water within heat exchanger structure 32 is greatly enhanced by provision of a plurality of tubular elements 44, as shown in the drawing, by virtue of the relatively large surface area of each body 34 exposed to the hot products 28 passing thereby.

Each of the plates 36 and 38 has a pair of diametrically opposed, internally threaded perforations 48 disposed adjacent the periphery thereof. Although all of the perforations 48 could be connected by conduits, it is more specifically contemplated that alternate, opposed perforations 48 shall be interconnected by conduits 50, with the remaining perforations being sealed with externally threaded plugs 52 to thereby cause the water flowing through heat exchanger structure 32 to describe a serpentine path. In this manner, the water is subjected to the action of the heat passing through chamber 12 for the greatest period of time.

A water supply pipe 54 is threaded into one of the perforations 48 of body 34 remote from tubular burner 24 and adjacent flue 30, while a water outlet pipe 56 is operably coupled with one of the perforations 48 of the body 34 proximal to burner 24.

In order to assure retention of heat within chamber 12, it is desirable to place a layer of insulation 58 around the inner surface of chamber 12, as well as an annular insulating member 60 secured to cover 18 and surrounding the inlet end of flue 30. Although not illustrated, it is also contemplated that a baffle in the nature of a firebrick or the like may be placed intermediate tubular burner 24 and the proximal body 34 to prevent the flame emanating from burner 24 directly impinging upon the adjacent body 34.

In operation, it can be seen that water enters heat exchanger 32 through inlet supply pipe 54 and follows a serpentine path through hollow bodies 34. The hot water passes from heat exchanger 32 via water outlet pipe 56 to a point of use. It is contemplated that fuel burner 24 be automatically connected to a water supply valve in such manner that burner 24 will be lighted and continue burning only so long as water flows through the valve. Of particular note in the instant invention is the use of identical plates 36 and 38 which may be cast in a single mold and then suitably secured together through provision of annular bands 42 and tubular elements 44, suitably welded to respective plates 36 and 38. It can be readily appreciated that the use of these universally interchangeable parts greatly decreases the cost of production thereof and also makes possible the use of as many units in the heat exchanger 32 as are necessary to raise the temperature of the water to a desired level when the maximum quantity of water is flowing through exchanger 32. It can be appreciated, however, that the bodies 34 could be cast as a single unit if desired.

Having thus described the invention what is claimed as new and desired to be secured by Letters Patent is:

In a water heater, an elongated, normally upright, hollow chamber having a longitudinal axis and provided with an inlet at the lower end thereof and an outlet at the upper end thereof; a tubular burner extending into said inlet and adapted for directing hot products of combustion upwardly through the chamber from said inlet to the outlet thereof; water-receiving structure disclosed in the chamber within the path of travel of said products, said structure including a series of substantially identical, relatively thin hollow bodies disposed in vertically spaced relationship between the inlet and said outlet of the chamber, each of said bodies including a pair of vertically-spaced circular plates disposed with their axes of revolution in substantial alignment with the longitudinal axes of the chamber and an annular band circumscribing each pair of plates and joined to the peripheral edges thereof, each of said plates having a central, circular opening and a plurality of circumferentially spaced, circular openings therein, the axes of revolution of said spaced openings being substantially parallel with the axis of revolution of said central opening and the openings in each plate being aligned with openings in the corresponding plate of each body, there being a tubular element having a longitudinal axis and extending through each pair of aligned openings in the plates and rigidly interconnecting the latter, the longitudinal axes of corresponding elements in each body being in alignment throughout the length of said chamber to provide unrestricted flow of said products of combustion through respective aligned elements; bracket means rigidly securing each of said bodies to the inner surface of said chamber; conduits intercommunicating alternate opposed portions of proximal bodies whereby the water describes a serpentine path in traveling through said structure; a water inlet pipe connected to the uppermost body; and a water outlet pipe connected to the lowermost body.

References Cited in the file of this patent

UNITED STATES PATENTS

| | | |
|---|---|---|
| 1,528,945 | Oehlstrom | Mar. 10, 1925 |
| 2,401,988 | Tribuson | June 11, 1946 |